United States Patent

DeHollander et al.

[11] 4,090,976
[45] May 23, 1978

[54] PROCESS FOR PRODUCING URANIUM OXIDE RICH COMPOSITIONS FROM URANIUM HEXAFLUORIDE

[75] Inventors: William R. DeHollander, San Jose, Calif.; Charles P. Fenimore, Schenectady, N.Y.

[73] Assignee: General Electric Company, San Jose, Calif.

[21] Appl. No.: 663,274

[22] Filed: Mar. 3, 1976

Related U.S. Application Data

[63] Continuation of Ser. No. 387,529, Aug. 10, 1973, abandoned.

[51] Int. Cl.² .............................................. C01G 43/02
[52] U.S. Cl. .............................. 252/301.1 R; 423/261
[58] Field of Search ................... 252/301.1 R; 423/261

[56] References Cited

U.S. PATENT DOCUMENTS

| | | | |
|---|---|---|---|
| 3,786,120 | 1/1974 | DeHollander et al. | 252/301.1 R |
| 3,790,493 | 2/1974 | Dada et al. | 252/301.1 R |
| 3,796,672 | 3/1974 | Dada et al. | 252/301.1 R |
| 3,808,145 | 4/1974 | Packard et al. | 252/301.1 R |

Primary Examiner—Benjamin R. Padgett
Assistant Examiner—Deborah L. Kyle
Attorney, Agent, or Firm—Ivor J. James, Jr.; Sam E. Laub; Samuel E. Turner

[57] ABSTRACT

Conversion of gaseous uranium hexafluoride to a uranium dioxide rich composition in the presence of an active flame in a reactor defining a reaction zone is achieved by separately introducing a first gaseous reactant comprising a mixture of uranium hexafluoride and a reducing carrier gas, and a second gaseous reactant comprising an oxygen-containing gas, the reactants being separated by a shielding gas as introduced to the reaction zone. The shielding gas temporarily separates the gaseous reactants and temporarily prevents substantial mixing and reacting of the gaseous reactants. The flame occurring in the reaction zone is maintained away from contact with the inlet introducing the mixture to the reaction zone. After suitable treatment, the uranium dioxide rich composition is capable of being fabricated into bodies of desired configuration for loading into nuclear fuel rods. In another embodiment, an oxygen-containing gas as a third gaseous reactant is introduced when the uranium hexafluoride conversion to the uranium dioxide rich composition is substantially complete. This results in oxidizing the uranium dioxide rich composition to a higher oxide of uranium with conversion of any residual reducing gas to its oxidized form.

40 Claims, 15 Drawing Figures

PROCESS FOR PRODUCING URANIUM OXIDE RICH COMPOSITIONS FROM URANIUM HEXAFLUORIDE

This is a continuation, of application Ser. No. 387,529, filed Aug. 10, 1973, now abandoned.

DESCRIPTION OF THE PRIOR ART

Uranium oxides have various utilities in the nuclear industry. Uranium dioxide is utilized in the nuclear industry as a fuel for nuclear reactors. In nuclear applications, uranium dioxide must have a low impurity content, a degree of enrichment with the $U^{235}$ isotope and a selected density from a given density range. The production of enriched uranium dioxide customarily takes place through use of the compound uranium hexafluoride so that a process is required for converting uranium hexafluoride into uranium dioxide in a form which can be readily fabricated to shaped bodies having a low fluoride content.

One current practice for converting uranium hexafluoride to uranium oxide employs hydrolysis of uranium hexafluoride to give a solution of uranyl fluoride and hydrogen fluoride from which ammonium diuranate is precipitated by the addition of ammonia. After recovery, the ammonium diuranate, which has a high fluoride ion content, is dissolved in nitric acid and fluoride decontamination of the resulting uranyl nitrate solution is accomplished by solvent extraction. From the resulting purified uranyl nitrate solution, ammonium diuranate is reprecipitated and then calcined to give $U_3O_8$ which in turn is reduced with hydrogen to give uranium dioxide.

Attempts have been made to replace this involved, expensive ammonium diuranate conversion process by gas phase reaction of uranium hexafluoride and an oxygen-containing atmosphere. One such method proposed in U.S. Pat. No. 3,235,327 teaches the reaction of uranium hexafluoride with steam at a temperature of at least 130° C in the presence of a gas inert to this conversion. This reaction produces uranyl fluoride in powder form having a surface area in the range of 3 to 12 square meters per gram. The uranyl fluoride powder is subsequently converted to uranium dioxide using hydrogen and steam at a temperature of 550° to 600° C. This method has the disadvantage of requiring a two chamber reactor.

Another process presented in U.S. Pat. No. 3,179,491 yields uranium dioxide by intimately and homogeneously mixing gaseous uranium hexafluoride with steam and at least one reducing gas selected from hydrogen, ammonia and carbon monoxide. This method involves the development of a rapid spiral movement of the reacting gases which is achieved by introducing the reacting gases through converging gas inlet pipes directed into a vertical reactor. This method has inherent limits on the rate of production of uranium dioxide.

In Japanese Patent Publication No. 10,095 of 1966, another method is presented which uses three separate concentric tubes to feed into a reaction chamber (1) a gaseous uranium hexafluoride, hydrogen and oxygen mixture in one tube, (2) hydrogen in a second tube and (3) oxygen in the third tube. The chamber is filled with hydrogen and the incoming gases react in a flame started by an igniter. Since hydrogen and oxygen are mixed in the same tube with the uranium hexafluoride, the uranium hexafluoride is converted to uranium oxide with it first comes in contact with the flame. The flame shown in the drawing of this publication occurs at the end of the concentric tubes feeding the gases into the chamber. Experiments have shown that this can involve the build-up of deposits on the ends of the concentric tubes resulting in plugging which interrupts the process. The process is thus discontinuous in that periodic removal of these deposits is required before further reaction can proceed.

Another attempt to replace the foregoing involved, expensive ammonium diuranate conversion process by a successful gas phase reaction of uranium hexafluoride is described in copending U.S. patent application Ser. No. 77,446, now U.S. Pat. No. 3,796,672, entitled Process for Producing Uranium Dioxide Rich Compositions from Uranium Hexafluoride filed Oct. 2, 1970 in the names of W. R. DeHollander and A. G. Dada and assigned to the same assignee as the present invention. Briefly this process can be summarized as a method of preparing a uranium dioxide rich composition from uranium hexafluoride in a reactor defining a reaction zone in the presence of an active flame comprising the steps of:

(a) introducing a first gaseous reactant comprising a mixture of uranium dioxide and an oxygen-containing carrier gas into the reaction zone, (b) separately introducing a second gaseous reactant comprising a reducing gas into the reaction zone, and (c) separately introducing a shielding gas into the reaction zone between the first gaseous reactant and the second gaseous reactant which temporarily prevents substantial mixing and reaction between the first and second gaseous reactants until sufficient cross diffusion of the reactants occurs as the reactants pass through the reaction zone.

An improvement of the foregoing process is described in copending U.S. patent application Ser. No. 131,685, now U.S. Pat. No. 3,790,493, entitled Post Oxidation Process for Uranium Dioxide Rich Compositions filed Apr. 6, 1971 in the names of A. G. Dada, W. R. DeHollander and R. J. Sloat and assigned to the same assignee as the present invention. Briefly this process can be summarized as a method of preparing a uranium oxide rich composition from uranium hexafluoride in a reaction zone in the presence of an active flame comprising the steps of:

(a) introducing a first gaseous reactant comprising a mixture of uranium hexafluoride and an oxygen-containing carrier gas into the reaction zone, (b) separately introducing a second gaseous reactant comprising a reducing gas into the reaction zone, (c) separately introducing a shielding gas into the reaction zone between the first and second gaseous reactants with temporarily prevents substantial mixing and reaction between the first and second gaseous reactants until sufficient cross diffusion of the reactants occurs as the reactants pass through the reaction zone, and (d) introducing a third gaseous reactant comprising an oxygen-containing gas into contact with the particulate uranium dioxide rich composition and the gaseous reaction products thereby converting the residual reducing gas in the reaction zone to an oxidized form and oxidizing the uranium dioxide rich composition to a higher oxide of uranium.

When subjected to microscopic examination, the uranium dioxide rich composition resulting from the practice of the process of U.S. Pat. No. 3,796,672 and the uranium oxide rich composition resulting from the practice of the process of U.S. Pat. No. 3,790,493 appear in the form of a powder composed of particles of discrete crystalline forms and possessing a generally uniform regular surface. When such a powder is compressed to give a green compact, the powder has a limitation in that the resulting compact possesses a relatively low green strength. Accordingly it has remained desirable to conduct a process for the conversion of uranium hexafluoride to uranium oxide producing a powder having a dendritic or semi-dendritic particle. A powder comprised of such particles would exhibit excellent characteristics and upon compaction yield a compact possessing higher green strength.

It has been postulated that the process for flame conversion of uranium hexafluoride to a uranium oxide should be conducted in a manner (1) enabling the formation of uranium tetrafluoride as an early intermediate product in the process, (2) producing a more diffuse and stable flame in the process and (3) giving good control over the temperature of the flame process.

SUMMARY OF THE INVENTION

It has now been surprisingly found that conversion of gaseous uranium hexafluoride to a uranium dioxide rich composition can be achieved in the presence of an active flame in a reaction zone by separately introducing a first gaseous reactant comprising a mixture of uranium hexafluoride and a reducing carrier gas and a second gaseous reactant comprising an oxygen-containing gas, the reactants being separated by a shielding gas as introduced to the reaction zone.

The conversion of the uranium hexafluoride to a uranium dioxide rich composition produces a flame in the reaction zone which burns at a position displaced, or lifted away, from the inlet used to introduce the gaseous mixture into the reaction zone. By this practice, there is no build-up of solids or condensation of water vapor at the tip of the inlet used to introduce the mixture to the reaction zone, and there is no interruption of the process.

The conversion of uranium hexafluoride to a uranium dioxide rich composition can include a subsequent step of introducing a third gaseous reactant comprising an oxygen-containing gas into contact with the particulate uranium dioxide rich composition and the gaseous reaction products thereby converting any residual reducing gas in the reaction zone to an oxidized form and oxidizing the uranium dioxide rich composition to a higher oxide of uranium, or a uranium oxide rich composition.

The uranium dioxide rich composition and the uranium oxide rich composition of this invention exhibit unexpected properties in that both compositions contain dendritic or semi-dendritic particles. These components exhibit excellent characteristics and upon compaction yield a compact possessing higher green strength.

OBJECTS OF THE INVENTION

It is an object of this invention to achieve a continuous gas phase reaction for converting uranium hexafluoride to either a uranium dioxide rich composition or to a uranium oxide rich composition, each composition being in the form of a powder containing dendritic or semi-dendritic particles.

A further object of this invention is to achieve a continuous gas phase reaction for converting uranium hexafluoride to either a uranium dioxide rich composition or to a uranium oxide rich composition which reaction will not involve the build-up of reaction products on the tip or open end of the inlet used to introduce the reactants into the reaction zone.

Another object of this invention is to introduce an oxygen-containing gas, a reducing gas and uranium hexafluoride to a reaction zone for a flame conversion reaction in a manner insuring rapid mixing of the reactants and a short reaction flame.

It is another object of this invention to surround a mixture of uranium hexafluoride and a carrier gas with a shielding gas as it is introduced into the reaction zone for a flame reaction.

Still another object of this invention is to provide a process for converting uranium hexafluoride to a uranium dioxide rich composition in which the reaction flame burns at a position displaced, or lifted away, from the inlet used to introduce the uranium hexafluoride to the reaction zone.

Another object of this invention is to provide a process utilizing the heat liberated in the conversion of uranium hexafluoride to a uranium dioxide rich composition for a subsequent conversion of the uranium dioxide rich composition to higher oxides of uranium and the conversion of any residual reducing gas to its oxidized form by introducing a third gaseous reactant comprising an oxygen-containing gas to the reaction zone at the time and location in the reaction zone where the conversion of uranium hexafluoride to the uranium dioxide rich composition is substantially complete.

Still another object of this invention is to fabricate the uranium oxide product into bodies of desired configuration for loading into nuclear fuel rods.

Still another object of this invention is to condense the gas stream resulting from the conversion reaction of uranium hexafluoride to either a uranium dioxide rich composition or to a uranium oxide rich composition to give an aqueous hydrofluoric acid by-product of commercial quality.

Still another object of this invention is to prevent excessive wall deposits from forming which would impair heat transfer to and from the reaction zone.

Other objects and advantages of this invention will become apparent to a person skilled in the art from a reading of the following description of the invention and the appended claims and by reference to the accompanying drawings.

DETAILED DESCRIPTION OF THE INVENTION

The foregoing objects have been acommmplished in a new process for thermal conversion of gaseous uranium hexafluoride to a uranium oxide rich composition in the presence of an autogenous flame in a reaction zone which separately receives a mixture of uranium hexafluoride and a reducing carrier gas as a first gaseous reactant, an oxygen-containing gas as a second gaseous reactant, and a shielding gas (shield gas) temporarily separating the first and second gaseous reactants from one another and temporarily preventing substantial mixing and reaction of the gaseous reactants. The shielding gas temporarily prevents the oxygen-containing gas from diffusing into the uranium hexafluoride-carrier gas mixture and also temporarily prevents diffusion of the uranium hexafluoride-carrier gas mixture into the oxygen-containing gas until the mixture has moved away from the inlet through which the uranium hexafluoride-carrier gas mixture is introduced into the reaction zone. After a brief delay, sufficient cross diffusion of the gases occurs and a flame reaction occurs. In a preferred practice of this invention the first gaseous reactant is maintained at a temperature less than about 550° C and preferably less than about 500° C until the gaseous reactant leaves the inlet and enters the reaction zone.

It has been discovered that one of the vexing causes of the failure of the prior art processes for continuous thermal conversion of uranium hexafluoride has been the build-up of reaction products, largely solid uranium oxides, at the gaseous uranium hexafluoride inlet to the reaction zone, apparently due to contact of the reaction flame with the inlet to the reaction zone. The process of the instant invention departs from such prior art in that a flow of shielding gas is employed to separate temporarily the first and second gaseous reactants after they have been introduced into the reaction zone. In this manner there is no reaction until the gaseous reactants have mixed sufficiently with each other by diffusing through the shielding gas. This provides a delay to the initiation of the conversion reaction with the result that the conversion flame is displaced and maintained away from the inlet introducing the first gaseous reactant to the reaction zone, and the formation of plugging deposits is avoided.

It is known that uranium hexafluoride and hydrogen react to yield uranium tetrafluoride at a temperature of about 600° C or higher and uranium tetrafluoride is a solid green salt which will readily deposit on surfaces as it is formed. For this reason, a person having ordinary skill in the art would avoid mixing hydrogen and uranium hexafluoride for introduction in an inlet to a reaction zone where a flame reaction process is to be conducted. The process of the present invention departs from this in that the uranium hexafluoride and a reducing carrier gas (which can contain hydrogen or dissociated ammonia) are mixed to form a gaseous reactant, and the resulting process yields rapid mixing and a short reaction flame. The process is conducted so that the inlet and the space inside the introducing the mixture is maintained below about 550° C, such as by having the flame lifted sufficiently from the inlet, or by using cooling means in association with the inlet, or by using an inert gas as a portion or all of the carrier gas.

The start-up of the process of the present invention may be accomplished in several ways.

One preferred sequence is as follows. Preferably, the reaction zone is preheated to a temperature of at least about 100° C to prevent condensation of water. First an oxygen-containing atmosphere is established in a reaction zone by a continuous flow of an oxygen-containing gas. Second, an ignition means in the reaction zone is operated to provide a source of ignition. Third, a flow of a reducing carrier gas is introduced to initiate a flame reaction and this reaction warms the reaction zone. This reducing gas may constitute a portion or all of the carrier gas. Fourth, the flow of the shielding gas is established. Fifth, the uranium hexafluoride gas is introduced to the reaction zone and the reaction is complete.

In another possible start-up sequence, the flows of the uranium hexafluoride and the carrier gas can be started simultaneously.

Another preferred start-up sequence is as follows. First the reducing carrier gas flows into the reaction zone. Second, the flow of shielding gas is started. Third, after a short delay, the oxygen-containing gas flow is started with operation of the ignitor to produce a flame. Fourth, the flow of uranium hexafluoride is begun.

Still another preferred start-up sequence is the same as in the preceding paragraph except the shielding gas is introduced first and then the reducing gas is introduced.

In the process of this invention, the shielding gas can be a gas non-reactive (i.e., an inert gas) with the reactants of this process, and can include nitrogen, argon, helium, neon, krypton, xenon and mixtures thereof. In addition, the shielding gas can be one which enters into the reaction, such as a reducing gas (hydrogen, dissociated ammonia and mixtures thereof) or a mixture of a reducing gas with any of the foregoing non-reactive gases. The oxygen-containing carrier gas is selected from the group consisting of air, oxygen and mixtures thereof. The reducing carrier gas is selected from the group consisting of hydrogen, dissociated ammonia, mixtures thereof and mixtures of the foregoing with an inert gas.

The present invention is based on the following apparent overall reduction-hydrolysis reaction in the presence of an active flame:

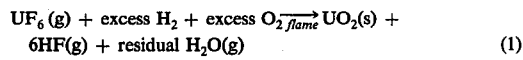

$$UF_6(g) + \text{excess } H_2 + \text{excess } O_2 \xrightarrow{flame} UO_2(s) + 6HF(g) + \text{residual } H_2O(g) \quad (1)$$

While the mechanism of this reaction is not definitely known at this time, it is possible that this reaction occurs by way of free radical reactants formed in the flame. In any event the reaction proceeds rapidly to produce a particulate uranium dioxide rich product. It is emphasized that the foregoing reaction is in no way comparable chemically to a simple hydrolysis reaction such as the hydrolysis of silicon tetrachloride (Si Cl$_4$ + H$_2$O→SiO$_2$ + 4 HCl) or to a simple reduction reaction such as the reduction of uranyl fluoride to uranium dioxide (UO$_2$F$_2$(s) + H$_2$→UO$_2$(s) + 2HF). Theoretical free radical reduction-hydrolysis reactions postulated for the conversion of uranium hexafluoride to uranium dioxide include uranyl fluoride or uranium tetrafluoride as an intermediate transitional product in the reaction.

DESCRIPTION OF THE DRAWINGS

Referring now to FIGS. 1 and 2, there is shown a reactor generally designated as 10 in which the process of this invention can be carried out. In the embodiment presented here, two tubes 11 mounted and sealed by seals 42 in cover 12 are used to introduce an oxygen-containing atmosphere in the reaction zone 18. The cover 12 forms a tight connection with vessel 13 by use of seal 9. The cover 12 has an inlet of concentric tubes 14 and 15 with tube 14 being sealed by seal 41 in cover 12. Tube 14 extends further into the reaction zone 18 than tube 15 by the distance designated $d$. Tube 15 is sealed tightly by seal 17 in tube 14 at a point external to the reactor 10. Ignitor 16 is provided to initiate the reaction.

Figure 1:
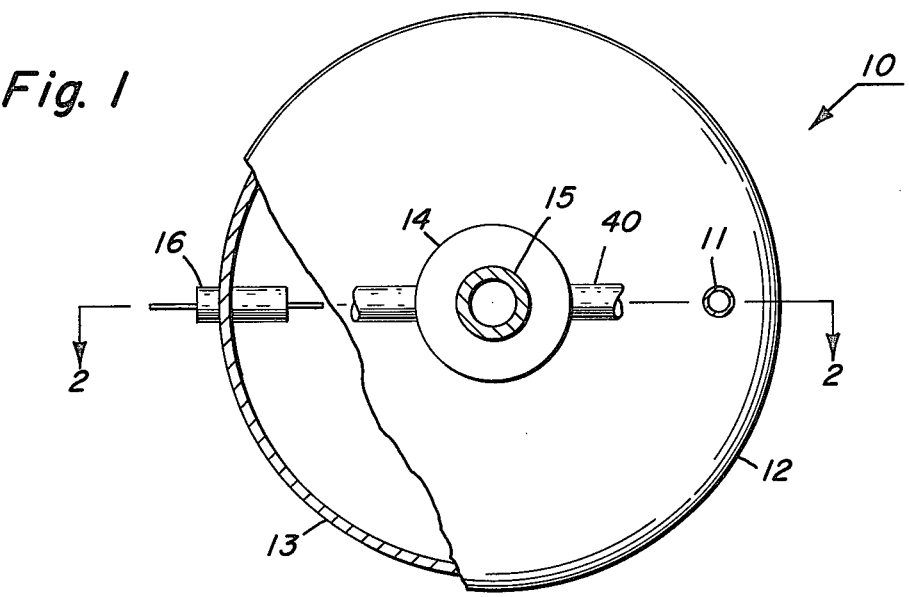
FIGS. 1 and 2 show respectively a top view partially cut away and a cut away side view of the upper portion of one reactor used in the practice of this invention, the reactor having a nozzle comprising a pair of concentric inlets for introducing the gaseous reactants to the reaction zone with the larger diameter inlet extending in the flow direction beyond the outlet end of the smaller diameter inlet for the purpose of confining and directing the flame.

A shielding gas is fed through inlets 40 into tube 14 and then into the reaction zone 18 and a gaseous reactant comprising a mixture of uranium hexafluoride and a carrier gas is fed the reaction zone 18 in tube 15 in the direction of the arrow. The flows of the gases in tubes 14 and 15 occur so that the shielding gas in tube 14 surrounds the gaseous reactant in tube 15 as the gases enter the reaction zone 18. The shielding gas shields the mixture of uranium hexafluoride and carrier gas from the oxygen-containing gas introduced to the reaction zone 18 in tubes 11 for sufficient time so that the boundary of initiation of the reaction flame in the reaction zone 18 is removed from the inlet formed by tubes 14 and 15 (called a "lifted flame"). The reaction results in a bright orange flame.

Figure 2:
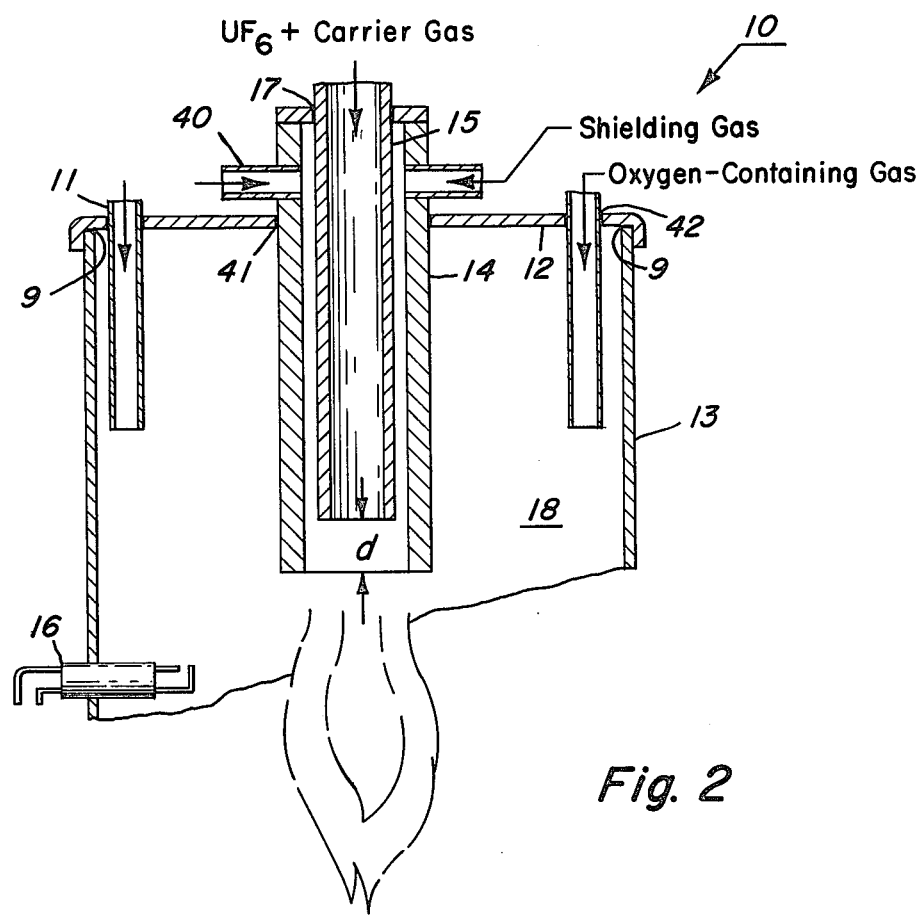

In practice of the process in the apparatus of FIGS. 1 and 2, it is preferred to start the process with the reaction zone preheated to a temperature of at least about 100° C to prevent the condensation of water vapor in the reaction zone. This prevents build-up of the uranium dioxide rich powders on the vessel 13 during the process run. This initial heating can be accomplished by external heating means or by letting the oxygen-containing gas react with reducing gas for a sufficient time to achieve the heating of the reaction zone 18 before introducing the gaseous uranium hexafluoride to the reaction zone. As a preliminary step, the reaction zone can be purged with a gas inert to the reaction such as nitrogen.

In one preferred processing sequence with the apparatus of FIGS. 1 and 2, the carrier atmosphere is first introduced to the reaction zone by feeding through tube 15. Then the flow of shielding gas in tube 14 is started, followed in a short time by the introduction of the oxygen-containing gas in tubes 11 with operation of igniter 16 to produce a flame. Subsequently the uranium hexafluoride is introduced in tube 15 so that it mixes with the carrier gas.

In another preferred start-up sequence, the oxygen-containing gas is first introduced in the reaction zone in tubes 11. Then the flow of shielding gas in tube 14 is started and igniter 16 is operated to provide means for initiating a flame, followed in a short time by the introduction of the carrier gas in tube 15. After the flame is stable, the uranium hexafluoride is introduced in tube 15 so that it mixes with the carrier gas.

The flow of the gases into the reaction zone is controlled so that the molar ratio of hydrogen to uranium hexafluoride is at least greater than stoichiometric proportions with a preferred lower limit of the ratio being about 4.0 and the molar ratio of oxygen to uranium hexafluoride is at least greater than stoichiometric proportions with a preferred lower limit of the ratio being about 1.2.

The reaction is conducted with a flame temperature of at least about 750° C or higher. The reaction zone is preferably maintained below atmospheric pressure by using a vacuum pump to draw about 1 to about 25 inches, preferably about 5 to about 15 inches, of mercury so that the reaction products are rapidly withdrawn from the reaction zone. It should be noted that this invention can be practiced at atmospheric pressure conditions or under applied pressure but any leaks that develop in the system are outward so it is preferred to apply a vacuum.

Figure 3:
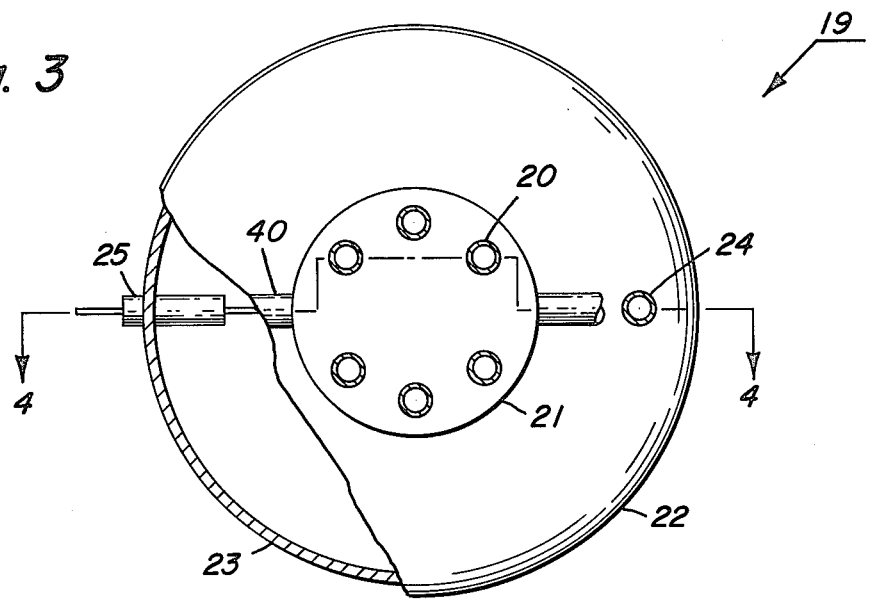
FIGS. 3 and 4 show respectively a top view partially cut away and a cut away side view of the upper portion of another reactor used in the practice of this invention, the reactor having a nozzle comprising a multiplicity of smaller diameter inlets for introducing multiple streams of reactants to the reaction zone, the smaller diameter inlets being arranged within and surrounded by a larger diameter inlet used for introducing the shielding gas to the reaction zone and the larger diameter inlet extending in the flow direction beyond the outlet end of the smaller diameter inlets, again for the purpose of confining and directing the flame.
Figure 4:
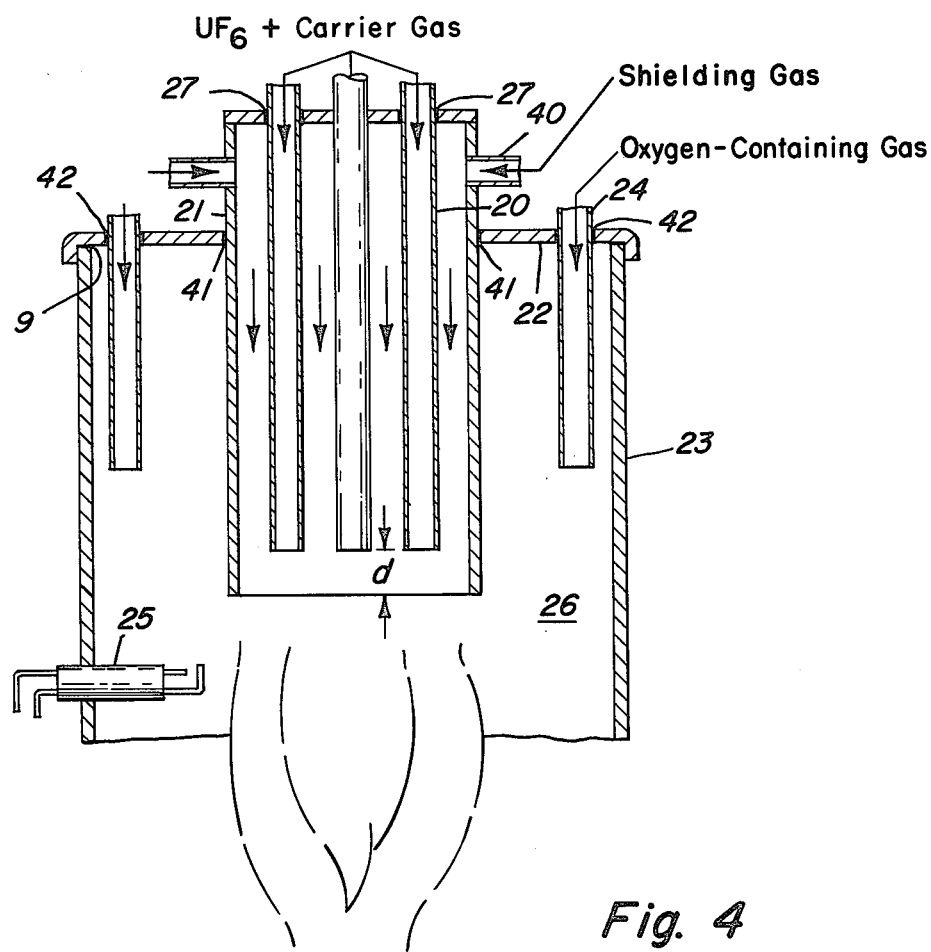

Referring now to FIGS. 3 and 4, there is shown a reactor inlet having a multiplicity of tubes for the mixture of uranium hexafluoride and the carrier gas which enables higher rates of production of the uranium dioxide rich product. In FIG. 3, a partially cut away top view of this embodiment of the reactor generally numbered 19 is presented. FIG. 4 is a sectional side view of the reactor taken along line 4—4 in FIG. 3. Here a multiplicity of tubes 20 of shorter length are enclosed within a larger, longer tube 21, with tube 21 being mounted and sealed by seals 41 in cover 22 of the reactor 19. Tubes 20 are shown symmetrically positioned within the tube 21 on a circle having a diameter greater than one-half the outside diameter of tube 21. Cover 22 is sealed by seal 9 on vessel 23 enclosing a reaction zone 26. Tubes 24, mounted and sealed by seals 42 in cover 22, are used to introduce the oxygen-containing gas into the reaction zone. Igniter 25 is provided to initiate the reaction. A continuous flow of the reducing carrier gas in tubes 20 is maintained throughout the reaction so that a strong reducing atmosphere is maintained in the reaction zone. Tubes 20 are sealed tightly by seals 27 in tube 21 at a point external to the reactor 19.

In the practice of this invention a shielding gas is fed through inlet 40 in the direction shown by the arrows through tube 21 into the reaction zone 26. In this manner the shielding gas surrounds the uranium hexafluoride-carrier gas mixture fed into the reaction zone 26 in tubes 20. The enveloping shielding gas shields the uranium hexafluoride-carrier gas mixture from the oxygen-containing gas for a sufficient time so that the boundary marking the initiation of the reaction flame is displaced or removed from the end of tube 21 (a "lifted flame"). The reaction results in a bright orange flame. The shielding gas, the oxygen-containing gas and the carrier gas are the same as previously listed. The preferred practices of the process described above in reference to FIGS. 1 and 2 are also applicable to the process using the apparatus presented in FIGS. 3 and 4.

Figure 5A:
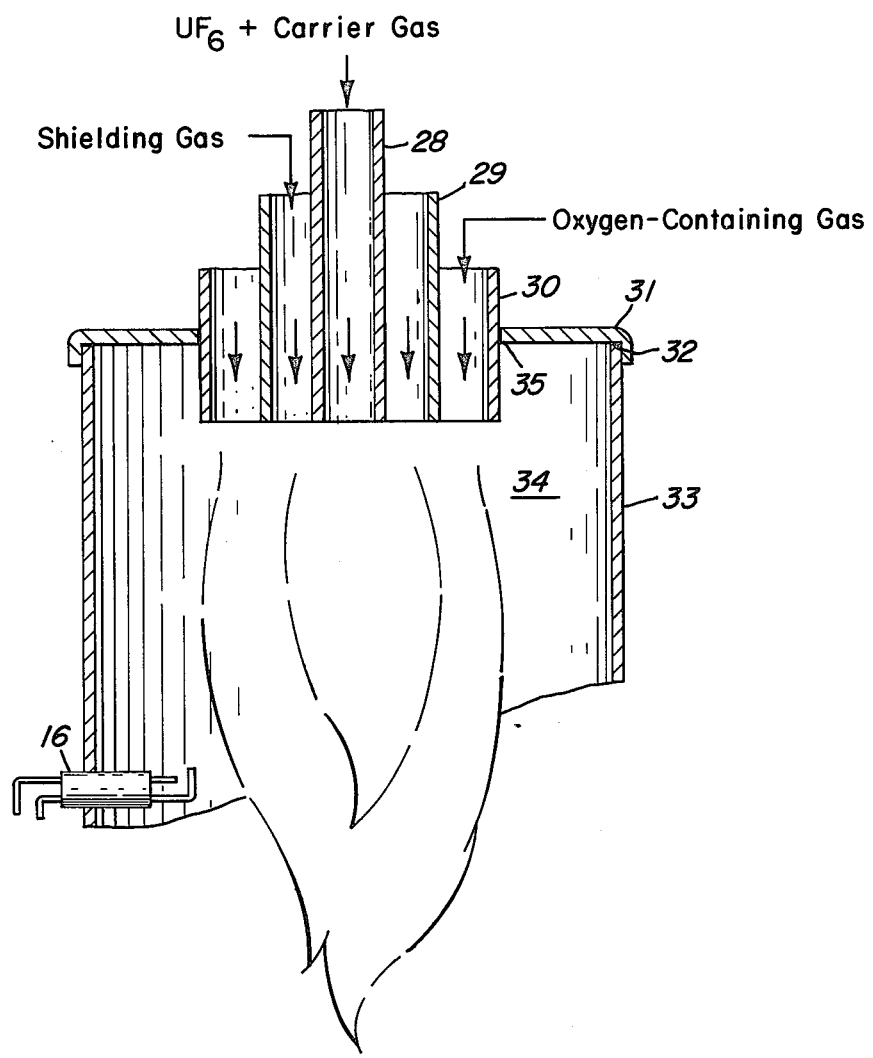
FIGS. 5a and 5b show a cut away side view of another reactor used in the practice of this invention, the reactor having a nozzle comprising three concentric tubes for introducing the gaseous reactants to the reaction zone, the tubes extending equal distances into the reaction zone.

Referring now to FIG. 5a, another apparatus for the practice of the process of this invention is presented. A partially cut away sectional side view of the reactor is shown in which the inlet has three concentric tubes 28, 29 and 30 entering cover 31. Cover 31 is sealed by seal 32 on vessel 33 enclosing a reaction zone 34. Igniter 16 is provided to initiate the reaction. In one arrangement, tube 28 is used to introduce the first gaseous reactant comprising a mixture of uranium hexafluoride and a carrier gas as described above. The second gaseous reactant, the oxygen-containing gas, is introduced to the reaction zone 34 in tube 30 which is sealed by seal 35 to cover 31. Tube 29 is used to introduce the shielding gas separating the first gaseous reactant from the second gaseous reactant.

Figure 5B:
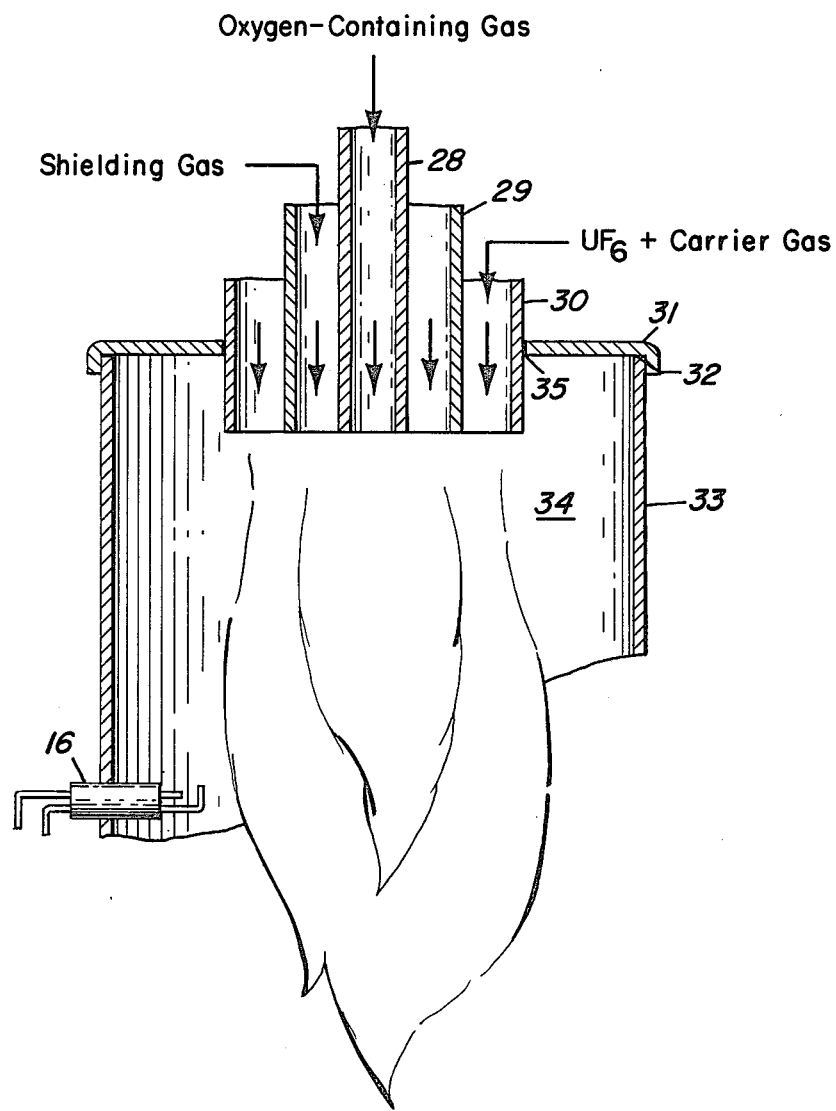

In another arrangement in FIG. 5b, tube 28 can be used to introduce the oxygen-containing gas and tube 30 can be used to introduce the mixture comprising uranium hexafluoride and a carrier gas. Tube 29 is used to introduce the shielding gas separating the first gaseous reactant from the second gaseous reactant. Tubes 28, 29 and 30 extend an equal distance into reaction zone 34 but with appropriate control of the velocities of the incoming gases a lifted flame is maintained during the conversion of uranium hexafluoride. The preferred practices of the process described above in reference to FIGS. 1 and 2 are also applicable to the process using the apparatus presented in FIG. 5.

Figure 6:
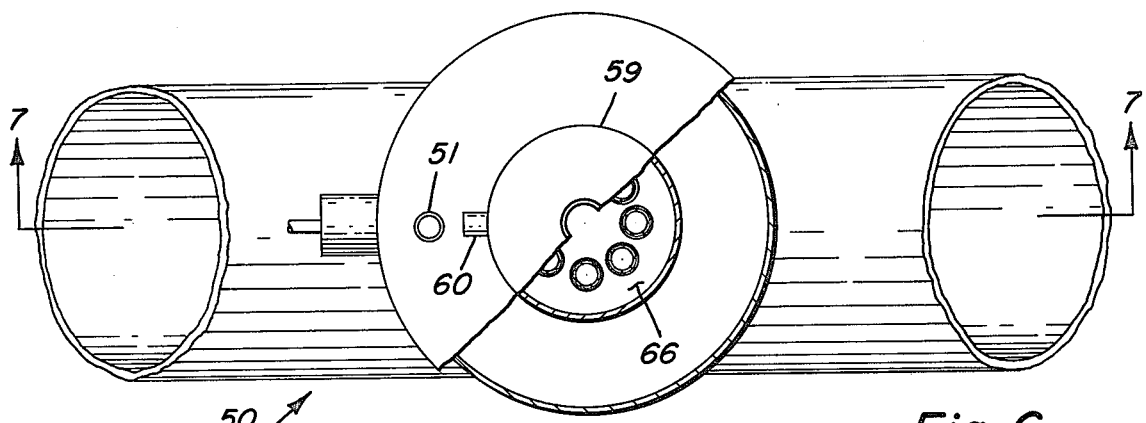
FIGS. 6 and 7 show respectively a top view partially cut away and a section side view of the upper portion of another reactor used in the practice of this invention including means for introducing a third gaseous reactant to the reaction zone at the time and location in the reaction zone where the conversion of uranium hexafluoride to uranium dioxide rich composition is substantially completed.
Figure 7:
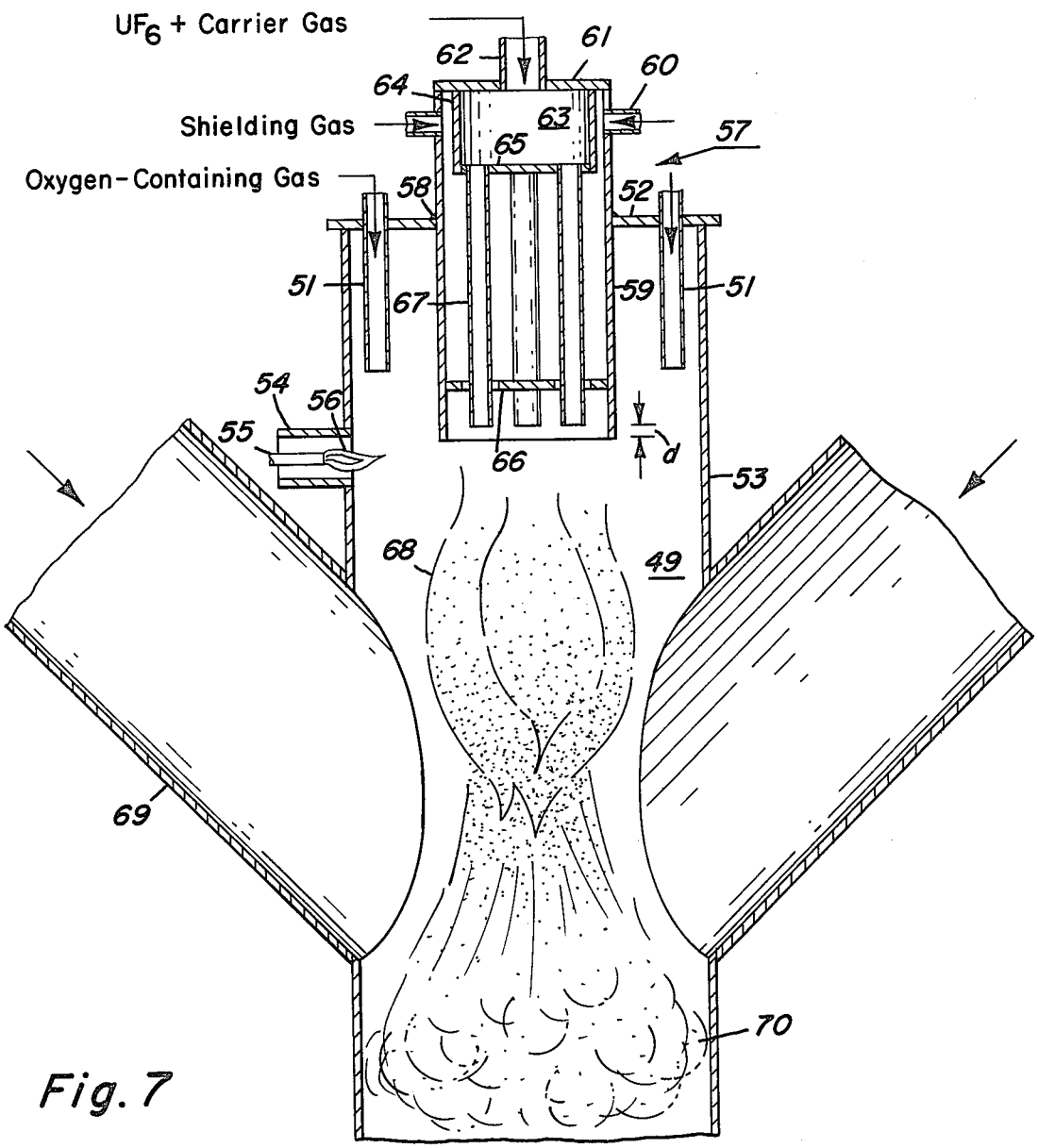

Another embodiment of the invention will now be discussed by refering to FIGS. 6 and 7 where there is shown a reactor generally designated as 50 in which another process of this invention can be carried out. In this embodiment, a first inlet means in the form of two tubes 51 mounted and sealed in cover 52 are used to introduce an oxygen-containing gas (the second gaseous reactant referred to above) in the direction of the arrow into the reaction zone 49. Cover 52 forms a tight seal with vessel 53 and the cover 52 is removable from the vessel 53. Vessel 53 has an outwardly protruding space 54 which holds a pilot burner 55 which receives gas and maintains a pilot flame 56 to initiate a flame reaction.

A portion of the nozzle generally designated as 57 is positioned in a central opening in cover 52 and sealed in an air tight connection by seals 58. The nozzle 57 has a second inlet means in the form of tube 59 with two tubular inlets 60 for introducing a shielding gas in the direction of the arrow in each inlet 60. The outer tube 59 has a cover 61 and cover 61 holds tubular inlet 62 which receives a mixture of uranium hexafluoride and a carrier gas. The mixture flows in the direction of the arrow in inlet 62 and enters the third inlet means which includes a chamber 63 formed by tube 64 which has a bottom portion 65. Bottom portion 65 has circular openings of size equal to the external diameter of tubes 67 which are connected to portion 65 so that tubes 67 receive the gas mixture from chamber 63. Tube 59 extends farther in reaction zone 49 than tubes 67 by the distance generally designated "d". A shielding gas direction control plate 66 is secured transversely in tube 59, and this plate is provided with openings through which tubes 67 extend coaxially forming an annular opening around each tube 67. This plate 66 forces the shielding gas to pass through the annular opening around each tube 67.

An inlet in the form of tubular members 69 is located downstream from the nozzle 57 at a position where the uranium hexafluoride conversion to a transient uranium dioxide rich composition is substantially complete. In FIG. 7 this position is shown with the centers of members 69 being approximately on a line with the tip of primary flame 68. An oxygen-containing gas is fed in inlets 69 so that the gas enters the reaction zone 49 and mixes with the reaction products from the primary flame 68. This results in a secondary flame 70 from the burning of the residual reducing gas to its oxidized product and the conversion of the uranium dioxide rich composition to a higher oxide of uranium with at least some oxide in a higher oxygen content than uranium dioxide. The following are representative of such uranium oxide(s): uranium tritaoctoxide ($U_3O_8$), uranium pentoxide ($U_2O_5$), $U_4O_9$ and mixtures of any of the foregoing with or without some uranium dioxide ($UO_2$).

The tubular members 69 approximately divide the reaction zone 49 into (1) a primary reaction zone with primary flame 68 including generally the space toward nozzle 57 from tubular members 69 and (2) a secondary reaction zone with secondary flame 70 including generally the space below tubular members 69 shown in FIG. 7.

Any of the apparatus and process embodiments presented above can be utilized in the practice of this invention utilizing a post oxidation step. The start up sequences of the aforementioned embodiments are modified so that when the flow of the oxygen-containing gas is started, the flow of oxygen-containing gas for the post oxidation step is also started.

This embodiment achieves additional advantages by the conversion of uranium hexafluoride to a uranium oxide rich composition. The oxidation of the reaction products of the primary flame 68 achieves substantially complete conversion of any residual reducing gas to its oxidized form (e.g., for hydrogen, water vapor). This eliminates any appreciable concentration of the reducing gas at the point of completion of the reaction sequence and this enables use of vacuum conditions to aid in drawing the reaction products from the reaction zone. This invention utilizes the heat liberated in the reaction zone from the primary flame 68 for subsequent conversion of the uranium dioxide rich composition from the primary flame 68 to higher oxides of uranium.

The velocity at which the gaseous reactant comprising a mixture of uranium hexafluoride and a carrier gas is introduced into the reaction zone is important. It has been found that the rate of flow of this mixture should be controlled so as to provide a gas velocity at the inlet which exceeds the flame propagation velocity. In this way the flame remains lifted away from the inlet to the reaction zone. The distance the flame is removed from tube 14 in FIG. 2, tube 21 in FIG. 4 and tubes 28–30 in FIGS. 5a and 5b is critical to the shape of the flame. If the distance is too great, there tends to be incomplete conversion of the uranium hexafluoride to oxide and if the distance is too small, the flame tends to burn too close to the tubes, eventually leading to a build-up of reaction products and condensation of water vapor on the tips of the tubes, resulting in plugging of the tubes.

The thickness, L, of the shielding gas around the reactants can be estimated from the formula: $L^2 = kDt$, in which L is the radial thickness of the shielding gas between the streams of the first and the second reactants, D is a diffusion constant, $t$ is the delay time required for the diffusion of the reactants through the shielding gas and $k$ is another constant. In general, the thickness of the shielding gas is proportional to the square root of the time of diffusion of the reactants through the shielding gas.

The reactors illustrated in the Figures preferably have a removable cover capable of being sealed on the vessel. The vessel and cover can be made of any material which is inert to the conversion reaction. Representative materials include Pyrex ®, glass and various metals and alloys such as steels and Monel ®. Various sealing means can be used between the removable cover and the reactor vessel including high temperature rubbers and high temperature polymeric sealants such as Teflon ®. The ignition means can be any of several devices for repetitively producing a spark in the reaction zone with one such device comprising a spark plug being in the proximity of the desired reaction flame but not close enough to the flame to receive deposition of reaction products. Another approach is to employ a pilot flame. The gas inlet tubes can be selected from various materials inert to the process including ceramic materials such as alumina and metallic materials such as Monel. The reactor vessel can be cylindrical in shape for ease of assembly, and the foregoing materials used for the vessel are readily available in cylindrical pipe form which can be cut to the desired length. A typical vessel is from two to six feet in length or longer with a diameter of from five to twenty inches. In the Figures, it will be noted that smaller diameter inlets such as inlets 15 and 20 in FIGS. 1–4 are positioned in larger diameter inlets such as inlets 14 and 21 in FIGS. 1–4 so that they terminate within the larger inlets by a distance $d$ which can range from $\frac{1}{8}$ of an inch to $\frac{1}{2}$ of an inch. Generally, the larger the diameter of pipes 14 and 21, the greater is distance $d$.

The process of this invention can be practiced with any of the foregoing listed constituents for the carrier, oxygen-containing and shielding gases. Table 1 lists representative gases which can be employed together to give successful conversion of uranium hexafluoride to a uranium dioxide rich composition by the flame conversion process of this invention.

TABLE I

|  | Reaction A | Reaction B | Reaction C |
|---|---|---|---|
| Carrier Gas | hydrogen | dissociated ammonia | hydrogen |
| Oxygen-containing Gas | oxygen | oxygen | air |
| Shielding Gas | nitrogen | nitrogen | hydrogen |
|  | Reaction D | Reaction E | Reaction F |
| Carrier Gas | dissociated ammonia | hydrogen | dissociated ammonia |
| Oxygen-containing Gas | air | oxygen | oxygen |
| Shielding Gas | dissociated ammonia | dissociated ammonia | hydrogen |
|  | Reaction G | Reaction H | Reaction I |
| Carrier Gas | hydrogen | dissociated ammonia | mixture of hydrogen and dissociated ammonia |
| Oxygen-containing Gas | air | air | mixture of oxygen and air |
| Shielding Gas | nitrogen | nitrogen | mixture of nitrogen and dissociated ammonia |

Studies on the uranium oxide powders produced in the practice of this invention indicate that the powders have superior properties and this constitutes one of the striking advantages of this invention. The superior properties of the powders of this invention are felt to be attributable to the dendritic or semidendritic particles found in the powder by metallographic examination. In particular the particles of powder have an appearance when magnified to 50000 times their size or greater of being rope-like or chain-like particles. This has been strikingly confirmed by electron transmission photographs. The powders produced by this invention have improved pressing properties due to the open structure of the powder particles and compaction of the powder yields green compacts of higher green strength than compacts of powders having particles of discrete crystalline forms (i.e., spheres and cubes). The powder is greater than 95 percent by weight uranium oxide, the balance being largely fluoride ions mostly in the form of hydrogen fluoride and other compounds containing uranium and fluorine not generally identifiable by x-ray diffraction. The powder has excellent surface properties with very high relative surface area compared to uranium dioxide powders produced by prior art processes. It is believed that these limited impurities in the powder prevent the powder from exhibiting any pyrophoric tendencies because the bond of the hydrogen fluoride with the uranium dioxide is not displaced by oxygen. Further, this hydrogen fluoride-uranium dioxide bond permits the powder to be handled without skin irritation. These powders can be readily sintered in compacted shapes in controlled atmospheres to achieve up to 99+% of the theoretical density by practice of the powder compaction and sintering portions of U.S. patent applications Ser. No. 77,447 and Ser. No. 153,749 now U.S. Pat. Nos. 3,786,120 and No. 3,819,804, respectively, which are hereby incorporated by reference.

Those skilled in the art will gain a further understanding of this invention from the following illustrative, but not limiting, examples of this invention.

EXAMPLE 1

This example is run according to steps of the process of U.S. Pat. No. 3,796,672.

A reactor is assembled as follows. A glass bell jar is fitted with a bottom cover which has three concentric copper tubes feeding upwards into the bell jar. The three concentric tubes form a diffusion burner and the area of the innermost tube is 0.38 cm$^2$, the middle tube is 0.82 cm$^2$ and the outer tube is 7.5 cm$^2$. A sample collection plate is provided in the bell jar in the form of a circular disk 5 cm in diameter held perpendicular to the flame rising from the nozzle, and is capable of being positioned at different elevations above the flame. The cover plate has an opening for a tube extending to the upper portion of the bell jar, and this tube is used for drawing a vacuum on the bell jar.

In this example air is fed to the innermost and middle tubes and hydrogen to the outer tube. UF$_6$ vapor is mixed with the air in the innermost tube and the air and hydrogen are fed to the assembly to give a hydrogen to oxygen ratio of 2.7. The hydrogen to UF$_6$ ratio is 9.3.

The following sequence is used to initiate the conversion of uranium hexafluoride to a uranium dioxide rich product. The reducing gas is started through the outer tube. Next the shielding gas (here air) is introduced into the reaction zone through the middle tube and the oxygen-containing gas (here air) is introduced into the reactor through the inner tube followed by manual ignition of a flame through a sparking device which gives a bluish flame lifted away from the concentric tubes. Then the bell jar was lowered over the burner onto the bottom cover and a vacuum is gradually drawn on the reaction zone defined by the bell jar and the bottom cover. After the bluish flame reaches equilibrium and the desired flow rates of gases are reached, the flow of uranium hexafluoride is started to create a mixture with the oxygen-containing gas in the inner tube. At this time the color of the lifted flame 68 changes to a bright orange color. The reaction was run for about three minutes. The vacuum drawn on the reaction zone during the process is 36 cm of mercury.

Figure 8:
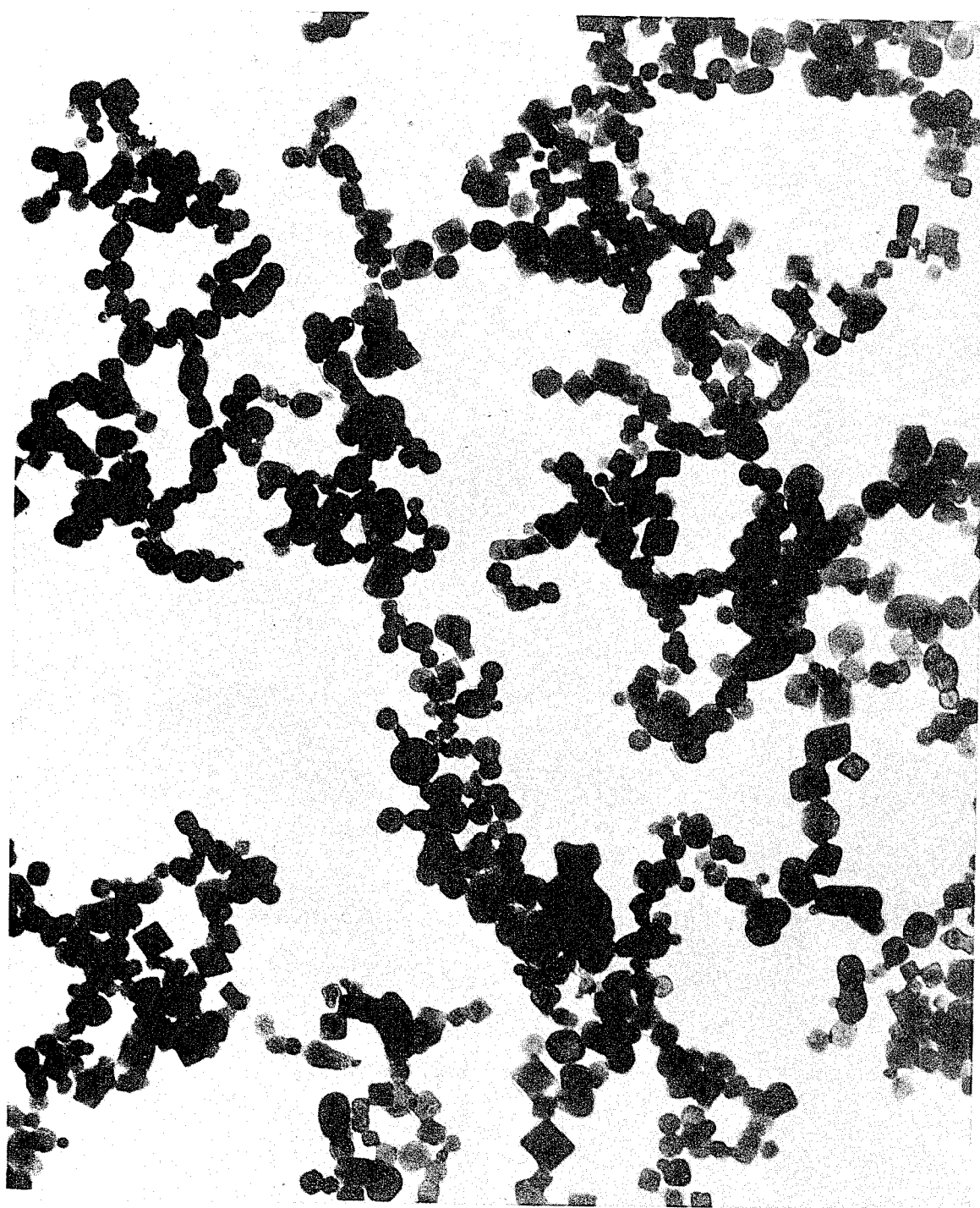
FIGS. 8-12 present photomicrographs (at a magnification of 75000 times) of particles of uranium oxide rich compositions produced according to the teaching of Examples 1-5.

The reaction proceeds with the unique feature of avoiding contact of the reaction products with the tip of the concentric tubes. The flame is lifted or removed from the concentric tubes approximately ½ inch throughout the run. This means that the formation of the uranium dioxide rich composition in the orange flame is occurring without contact of the products of the flame with the concentric tubes. The run produces a composition having about 95% by weight uranium dioxide and an electron photomicrograph at 75000 times magnification is shown in FIG. 8. The powder in FIG. 8 is composed of particles of discrete crystalline polyhedra, and the particles possess a generally uniform regular surface (i.e., "spheres and cubes") and are collected using the sample collection plate. When the powder was compacted on a rotary press at green density of 5.3 grams/cubic centimeter to form green pellets of a configuration of a right circular cylinder of about 0.5 inch in height and about 0.5 inch in diameter, the green rupture pressure was 160 to 180 pounds per square inch. The green rupture pressure is a measure of green pellet strength and represents the pressure required to fracture the green pellets in a hand press.

EXAMPLE 2

Figure 13:
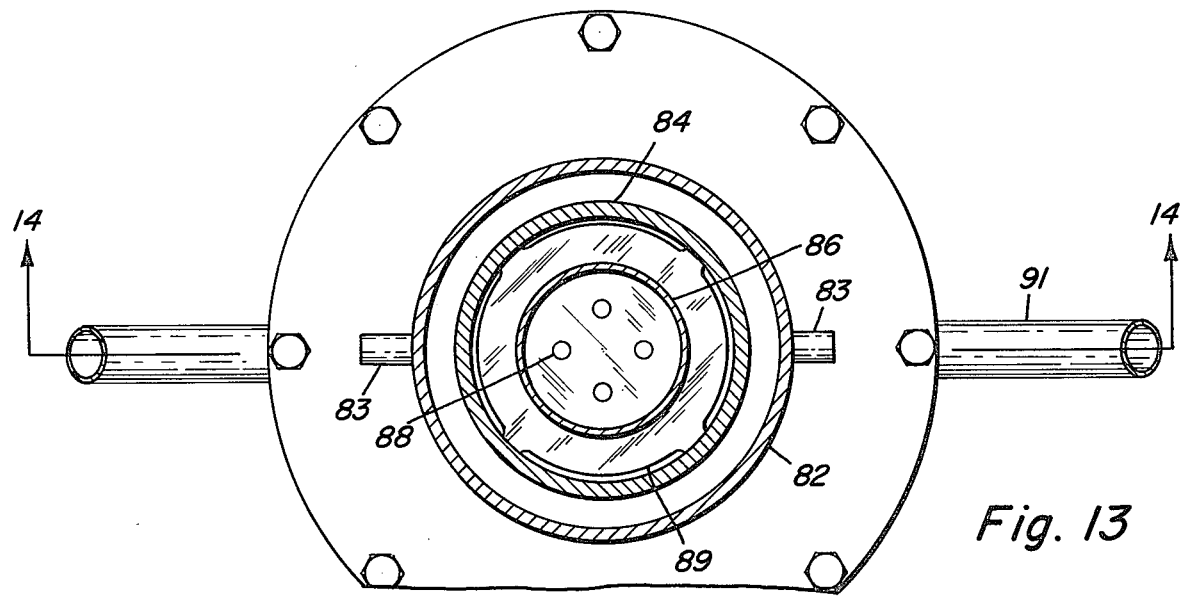
FIGS. 13 and 14 show respectively a top view and a cut away side view of another reactor used in Examples 2-5.
Figure 14:
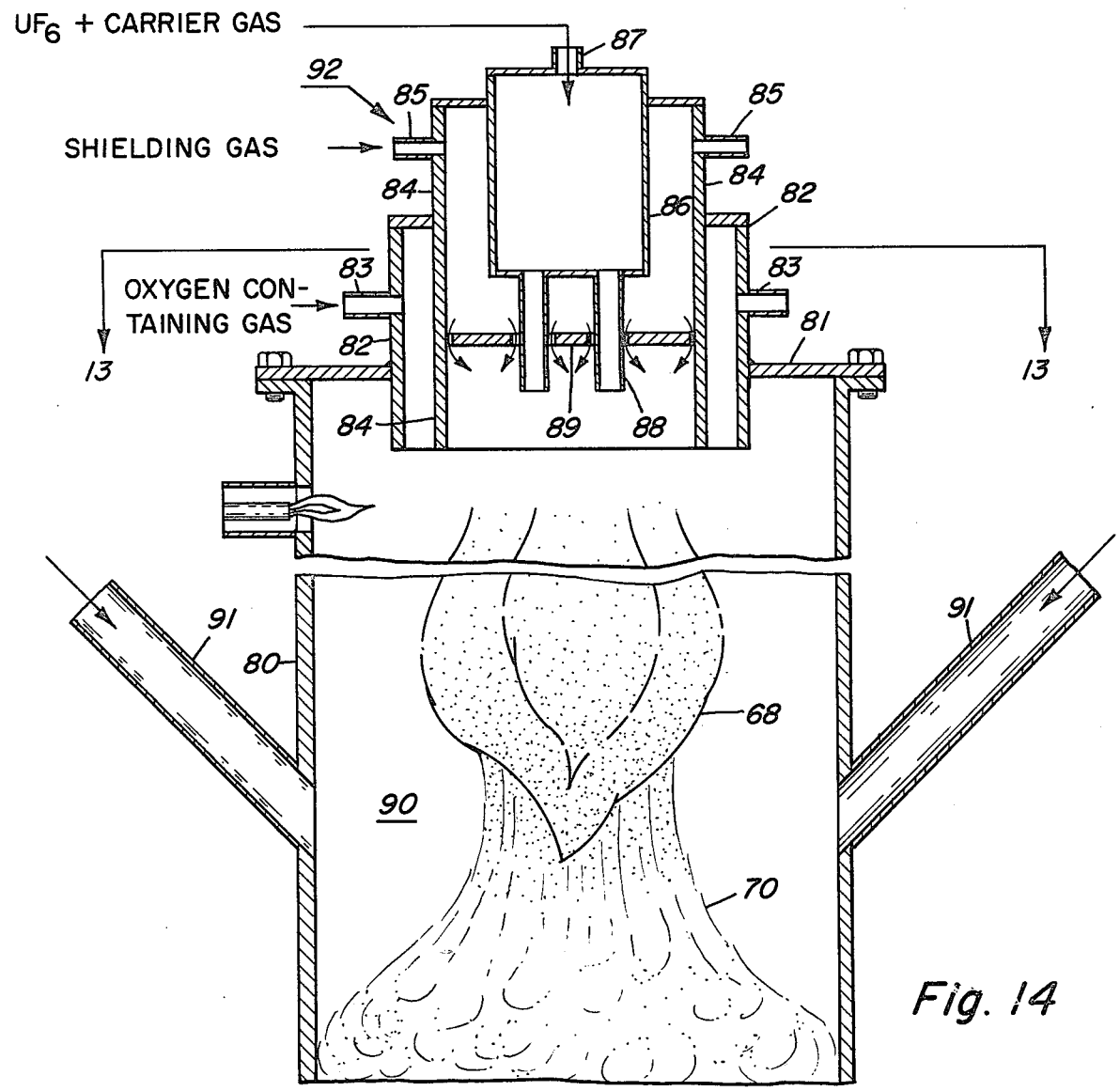

A reactor shown in FIGS. 13 and 14 is assembled. A reactor vessel 80 supports a nozzle flange 81 and the flange 81 is bolted to the reactor vessel 80. Flange 81 is welded to outer cylindrical tube 82 and tube 82 has inlets 83. Outer cylindrical tube 82 is welded to inner cylindrical tube 84 and tube 84 has inlets 85. Inner cylindrical tube 84 is welded to inner cylindrical chamber 86 and chamber 86 has inlet 87 at the upper end and four tubular outlets 88 at the lower end. A shield gas direction control plate 89 is welded to cylinder 84 at four generally evenly spaced locations as shown in FIG. 13. Tubes 88 extend through openings in the direction control plate 89 toward the reaction zone 90.

Tubes 88 have an inner diameter of 0.250 inch and an outer diameter of 0.540 inch. The openings in direction control plate 89 surrounding tubes 88 are 0.72 inch in diameter. The clearance between the direction control plate 89 and tube 84 is 0.078 inch. The inner diameter of tube 84 is 3.026 inches and the outer diameter is 3.500 inches. The inner diameter of tube 82 is 4.026 inches. The tubes 88 are recessed within tube 84 about ½ inch. Tubular members 91 are four Monel pipes of ½ inch inside diameter mounted at a 45° angle to the axis of reactor vessel 80. The center of members 91 is about 18 inches from the open end of tube 82. Flange 81, tube 82, direction control plate 89 and tube 84 are made of carbon steel, the remainder of the nozzle 92 is made of Monel and the reactor vessel is made of Inconel.

A pilot flame is started in reaction zone 90 with the following start-up sequence. A source of air as the oxygen-containing gas is introduced in inlet 83 and in members 91 as the third gaseous reactant. A source of shielding gas of hydrogen is connected to inlets 85 of tube 84 and fed into the reaction zone 90. A mixture of uranium hexafluoride, nitrogen and hydrogen is fed into chamber 86 and the four tubes 88. The uranium oxide powder is collected while the off gases are treated to condense hydrogen fluoride and water vapor. The rate of flow of uranium hexafluoride is 12.0 pounds per hour. The effective molar ratio of hydrogen to uranium hexafluoride is 24. The effective molar ratio of hydrogen to uranium hexafluoride is 24. The effective molar ratio of hydrogen to oxygen at the opening of the nozzle into the reaction zone is about 2.7. The flow rate in standard cubic feet per hours is as follows: hydrogen in chamber 86 – 60 SCFH, nitrogen in chamber 86 – 100 SCFH, hydrogen as the shield gas in tube 84 – 260 SCFH, air in tube 82 – 565 SCFH and total air — 790 SCFH. A vacuum is drawn on the reactor vessel 80 of 7.5 inches of mercury during the process.

Figure 9:

The reaction proceeds with the unique feature of avoiding contact of the reaction products with the tip of tubes 82, 84 and 88. The flame is lifted or removed from tube 82 approximately ½ inch throughout the run. This means that the formation of the uranium oxide rich composition in the primary orange flame 68 is occurring without contact of the products of the flame with the nozzle 92. There is a tapering of the laminar primary flame in the reaction zone at a point about adjacent the center of members 91 below which there is a secondary darker orange flame 70 which is turbulent. The run produces a composition having about 95% by weight uranium tritaoctoxide ($U_3O_8$) and a photomicrograph at 75000 times magnification is shown in FIG. 9. The powder in FIG. 9 is composed of particles having a dendritic or semidendritic appearance and the particles possess an irregular surface (i.e., "porcupinicity"). When the powder was compacted on a rotary press at green density of 5.3 grams/cubic centimeter to form green pellets of a configuration of a right circular cylinder of about 0.5 inch in height and about 0.5 inch in diameter, the green rupture pressure was 220 to 240 pounds per square inch. The green rupture pressure is a measure of green pellet strength and represents the pressure required to fracture the green pellets in a hand press.

EXAMPLES 3-5

Figure 10:
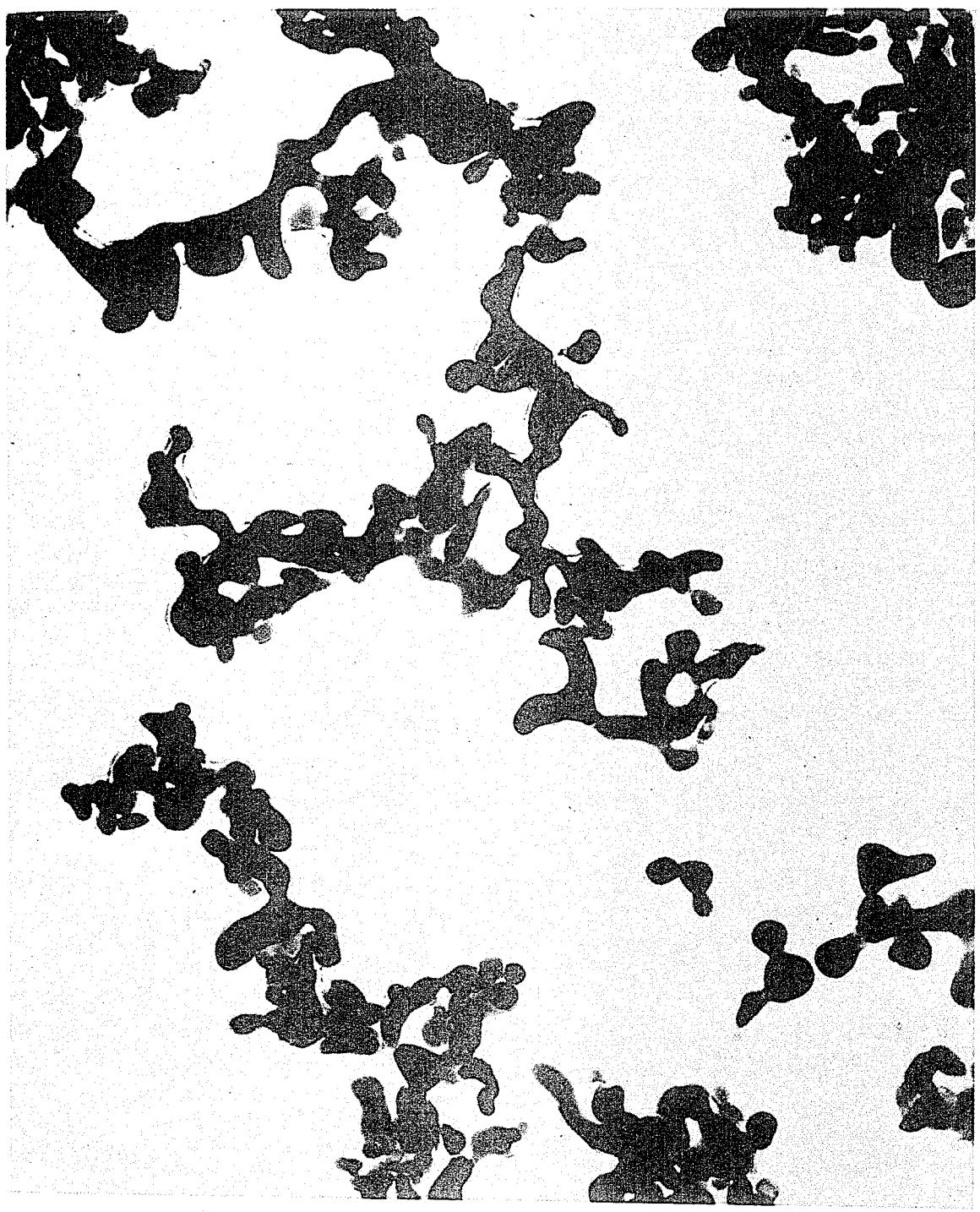
Figure 11:
Figure 12:
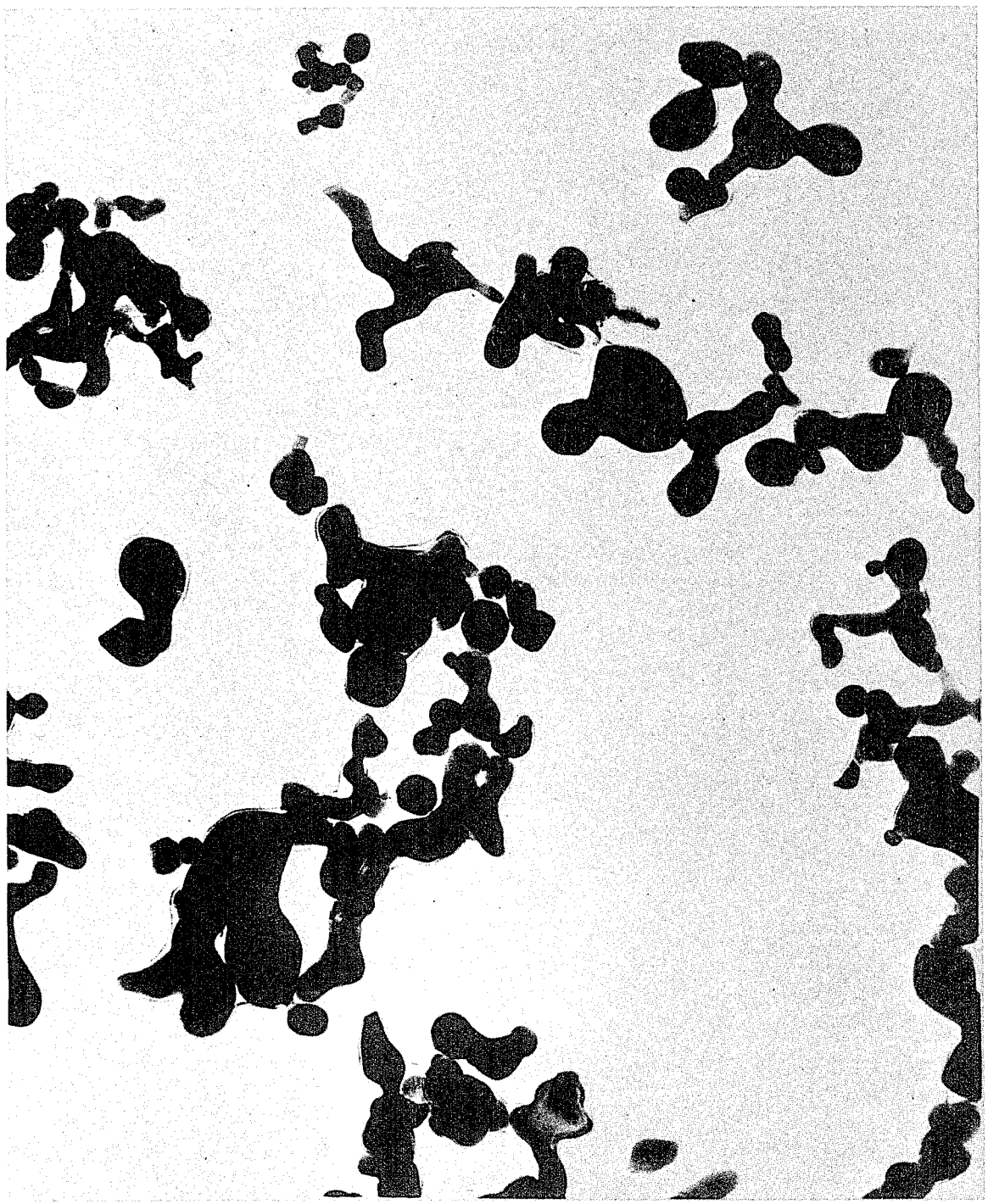

The process of Example 2 is repeated using the same general procedure and apparatus for Examples 3-5, and the reaction proceeds with the unique feature of avoiding contact of the reaction products with the tip of tubes 82, 84 and 88. The flame is lifted or removed from tubes 82 and 84 approximately ½ inch throughout the run. This means that the formation of the uranium oxide rich composition in the orange flame is occurring without contact of the products of the flame with the nozzle 92. Table 2 is used to present the significant information of each run with the first column being the Example number, the second column being the feed rate of $UF_6$ in pounds per hour, the third column being the molar ratio of hydrogen to uranium hexafluoride, the fourth column being the molar ratio of hydrogen to oxygen at the nozzle, the fifth column being the flow rate of hydrogen in chamber 86, the sixth column being the flow rate of nitrogen in chamber 86, the seventh column being the flow rate of hydrogen as the shield gas in tube 84, the eighth column being the flow rate of air in tube 82, the ninth column being the flow rate of all air (total air) to the reactor and the last column is the rupture pressure in pounds per square inch for pellets formed according to the procedure of Example 2. All flow rates are in standard cubic feet per hour. FIGS. 10-12 present electron photomicrographs at 75000 times magnification respectively of a sample of the powder produced in Examples 3-5.

TABLE 2

| Example Number | UF$_6$ Rate | H$_2$/UF$_6$ | H$_2$/O$_2$ Nozzle | H$_2$ Carrier | N$_2$ Carrier | H$_2$ Shield | Air Nozzle | Air Total | Rupture Pressure psi |
|---|---|---|---|---|---|---|---|---|---|
| 3 | 12 | 24 | 4.0 | 60 | 100 | 260 | 390 | 790 | 200 |
| 4 | 24 | 12 | 4.0 | 60 | 100 | 260 | 390 | 790 | 160-180 |
| 5 | 12 | 12 | 4.0 | — | 100 | 320 | 390 | 790 | — |

As will be apparent to those skilled in the art, various modifications and changes may be made in the method and apparatus described herein. It is accordingly the intention that the invention be construed in the broadest manner within the spirit and scope as set forth in the accompanying claims.

What is claimed is:

1. The method of preparing a uranium dioxide rich composition in the form of dendritic particles from uranium hexafluoride in a reaction zone in the presence of an active flame comprising the steps of:
   (a) introducing a first gaseous reactant comprising a mixture of uranium hexafluoride and a reducing carrier gas into the reaction zone, said reactant being maintained at a temperature of less than about 550° C prior to introduction into the reaction zone in order to avoid any reaction between the uranium hexafluoride and the reducing gas prior to the introduction of said reactant to the reaction zone,
   (b) separately introducing a second gaseous reactant comprising an oxygen-containing gas into the reaction zone, and
   (c) separately introducing a shielding gas into the reaction zone between said first gaseous reactant and said second gaseous reactant which temporarily prevents substantial mixing and reaction between said first gaseous reactant and said second gaseous reactant to produce a uranium dioxide rich composition until sufficient cross diffusion of said reactants and the shielding gas occurs as said reactants and the shielding gas pass through the reaction zone.

2. The method of claim 1 where the method is initiated by the sequential steps of:
   (a) introducing the carrier gas into the reaction zone,
   (b) introducing the shielding gas into the reaction zone,
   (c) introducing the oxygen-containing carrier gas into the reaction zone, and
   (d) introducing the uranium hexafluoride to form a mixture with the carrier gas with the mixture entering the reaction zone temporarily separated from the oxygen-containing gas by the shielding gas.

3. The method of claim 2 in which the carrier gas and the uranium hexafluoride are introduced simultaneously into the reaction zone.

4. The method of claim 1 where the method is initiated by the sequential steps of:
   (a) introducing the oxygen-containing gas into the reaction zone,
   (b) introducing the shielding gas into the reaction zone,
   (c) introducing the carrier gas into the reaction zone, and
   (d) introducing the uranium hexafluoride to form a mixture with the carrier gas with the mixture entering the reaction zone temporarily separated from the oxygen-containing gas by the shielding gas.

5. The method of claim 1 where the reaction zone is purged with an inert gas prior to introducing the gaseous reactants to the reaction zone.

6. The method of claim 1 wherein said first gaseous reactant comprising a mixture of uranium hexafluoride and carrier gas is introduced into the reaction zone as a plurality of individual adjacent streams and the streams are surrounded by said shielding gas.

7. The method of claim 1 where the carrier gas is selected from the group consisting of hydrogen, dissociated ammonia, mixtures thereof, and mixtures of the foregoing with an inert gas.

8. The method of claim 1 where the oxygen-containing gas is selected from the group consisting of oxygen, air and mixtures thereof.

9. The method of claim 1 where the shielding gas is selected from the group consisting of hydrogen, dissociated ammonia, an inert gas and mixtures thereof.

10. The method of claim 1 where the shielding gas is an inert gas.

11. The method of claim 1 where the carrier gas is an inert gas and the shielding gas is selected from the group consisting of hydrogen, dissociated ammonia, a mixture of hydrogen and dissociated ammonia, a mixture of hydrogen and an inert gas, a mixture of dissociated ammonia and an inert gas and a mixture of hydrogen, dissociated ammonia and an inert gas.

12. The method of claim 1 where the molar ratio of the reducing gas to uranium hexafluoride is at least about 4.0 and the molar ratio of oxygen to uranium hexafluoride is at least about 1.2.

13. The method of claim 1 where the reaction occurs in a flame at a temperature of at least about 750° C.

14. The method of claim 1 in combination with the preliminary step of preheating the reaction zone to an initial temperature of at least about 100° C.

15. The method of claim 1 where the reaction zone is maintained under a vacuum of about 1 to about 25 inches of mercury to draw the reaction products from the reaction zone.

16. The method of claim 1 where the gas stream withdrawn from the reaction zone is treated to collect hydrogen fluoride and water vapor from the gas stream in the form of hydrofluoric acid.

17. The product prepared according to the process of claim 1.

18. A method of converting uranium hexafluoride to a uranium dioxide rich powder in the form of dendritic particles by a continuous flame reaction comprising the steps of:
   (a) introducing an oxygen-containing gas into a reaction zone initially heated to a temperature of at least about 100° C and maintained under a vacuum of about 1 to about 25 inches of mercury,
   (b) operating an ignition means in said reaction zone,
   (c) introducing a shielding gas into the reaction zone,
   (d) introducing a reducing carrier gas so that it is surrounded by the shielding gas upon entering the reaction zone, (e) introducing a flow of uranium hexafluoride so that it is mixed with the reducing gas, said mixture being maintained at a temperature of less than about 550° C prior to introduction into the reaction zone in order to avoid any reaction between the uranium hexafluoride and the reducing gas prior to introduction of said mixture to the reaction zone, and said mixture being surrounded by the shielding gas upon entering the reaction zone giving a reaction flame maintained out of contact with any solid structural surface defining said reaction zone, and (f) collecting the uranium dioxide rich powder produced in the reaction zone.

19. The method of claim 18 where multiple flows of the mixture comprising uranium hexafluoride and the reducing gas are introduced into said reaction zone and each of said multiple flows is surrounded by the shielding gas giving a reaction flame removed from contact with any solid structural surface in said reaction zone.

20. A method of converting uranium hexafluoride to a uranium dioxide rich powder in the form of dendritic particles by a continuous flame reaction comprising the steps of:

(a) introducing a reducing carrier gas into a reaction zone initially heated to a temperature of at least about 100° C and maintained under a vacuum of about 1 to about 25 inches of mercury, (b) operating an ignition means in said reaction zone, (c) introducing a shielding gas into the reaction zone so that the shielding gas surrounds the reducing gas upon entering the reaction zone, (d) introducing an oxygen-containing gas into the reaction zone, (e) introducing a flow of uranium hexafluoride so that it is mixed with the reducing gas, said mixture being maintained at a temperature of less than about 550° C prior to introduction into the reaction zone in order to avoid any reaction between the uranium hexafluoride and the reducing gas prior to introduction of said mixture of the reaction zone and said mixture being surrounded by the shielding gas upon entering the reaction zone giving a reaction flame removed from contact with any solid structural surface defining said reaction zone, and (f) collecting the uranium dioxide rich powder produced in the reaction zone.

21. The method of claim 20 where multiple flows of the mixture of uranium hexafluoride and the reducing gas are introduced into said reaction zone and each of said multiple flows is surrounded by the shielding gas giving a reaction flame removed from contact with any solid structural surface in said reaction zone.

22. A method of preparing a uranium oxide rich composition in the form of dendritic particles from uranium hexafluoride in a reaction zone in the presence of an active flame having the steps of:

(a) introducing a first gaseous reactant comprising a mixture of uranium hexafluoride and a reducing carrier gas into the reaction zone, said reactant being maintained at a temperature of less than about 550° C prior to introduction into the reaction zone in order to avoid any reaction between the uranium hexafluoride and the reducing gas prior to introduction of said first reactant to the reaction zone, (b) separately introducing a second gaseous reactant comprising an oxygen-containing gas into the reaction zone, (c) separately introducing a shielding gas into the reaction zone between said first gaseous reactant and said second gaseous reactant which temporarily prevents substantial mixing and reaction between said first and second gaseous reactants to produce a uranium dioxide rich composition until sufficient cross diffusion of said reactants and the shielding gas occurs as said reactants and the shielding gas pass through the reaction zone resulting in conversion of the uranium hexafluoride to a particulate uranium dioxide rich composition in the presence of residual reducing gas and gaseous reaction products, and (d) introducing a third gaseous reactant comprising an oxygen-containing gas into contact with the particulate uranium dioxide rich composition, the residual reducing gas and the gaseous reaction products thereby converting the residual reducing gas in the reaction zone to an oxidized form and oxidizing the uranium dioxide rich composition to a higher oxide of uranium.

23. A method of claim 22 where the method is initiated by the sequential steps of:

(a) introducing the carrier gas into the reaction zone,
(b) introducing the shielding gas into the reaction zone,
(c) introducing the oxygen-containing gas and the third gaseous reactant into the reaction zone, and
(d) introducing the uranium hexafluoride to form a mixture with the reducing gas with the mixture entering the reaction zone temporarily separated from the oxygen-containing gas by the shielding gas.

24. The method of claim 22 in which the carrier gas and the uranium hexafluoride are introduced simultaneously into the reaction zone.

25. The method of claim 22 where the method is initiated by the sequential steps of:

(a) introducing the oxygen-containing gas and the third gaseous reactant into the reaction zone,
(b) introducing the shielding gas into the reaction zone,
(c) introducing the carrier gas into the reaction zone, and
(d) introducing the uranium hexafluoride to form a mixture with the carrier gas with the mixture entering the reaction zone temporarily separated from the reducing gas by the shielding gas.

26. The method of claim 22 where the reaction zone is purged with an inert gas prior to introducing the gaseous reactants to the reaction zone.

27. The method of claim 22 wherein the first gaseous reactant comprising a mixture of uranium hexafluoride and a carrier gas is introduced into the reaction zone as a plurality of individual streams and the streams are surrounded by the shielding gas.

28. The method of claim 22 where the carrier gas is selected from the group consisting of hydrogen, dissociated ammonia, an inert gas and mixtures thereof.

29. The method of claim 22 where the oxygen-containing gas is selected from the group consisting of oxygen, air and mixtures thereof.

30. The method of claim 22 where the shielding gas is selected from the group consisting of hydrogen, dissociated ammonia, an inert gas and mixtures thereof.

31. The method of claim 22 where the shielding gas is an inert gas.

32. The method of claim 22 where the carrier gas is an inert gas and the shielding gas is selected from hydrogen, dissociated ammonia, a mixture of hydrogen and dissociated ammonia, a mixture of hydrogen and an inert gas, and a mixture of hydrogen, dissociated ammonia and an inert gas.

33. The method of claim 22 where the reaction occurs in a flame at a temperature of at least about 750° C.

34. The method of claim 22 in combination with the preliminary step of preheating the reaction zone to an initial temperature of at least about 100° C.

35. The method of claim 22 where the reaction zone is maintained under a vacuum of about 1 to about 25 inches of mercury.

36. The method of claim 22 where the gas stream withdrawn from the reaction zone is treated to collect hydrogen fluoride and water vapor from the gas stream in the form of an aqueous solution of hydrofluoric acid.

37. The method of claim 22 in which the third gaseous reactant is oxygen.

38. The method of claim 22 in which the third gaseous reactant is air.

39. The method of claim 22 in which the third gaseous reactant is a mixture of oxygen and air.

40. The product prepared according to the process of claim 22.

* * * * *